United States Patent
Wei

(10) Patent No.: US 7,006,510 B2
(45) Date of Patent: Feb. 28, 2006

(54) METHOD OF CLOCK MISMATCH AND DRIFT COMPENSATION FOR PACKET NETWORKS

(75) Inventor: Li Wei, Cupertino, CA (US)

(73) Assignee: Optibase Ltd., Herzelia (IL)

( * ) Notice: Subject to any disclaimer, the term of this patent is extended or adjusted under 35 U.S.C. 154(b) by 758 days.

(21) Appl. No.: 09/760,646

(22) Filed: Jan. 17, 2001

(65) Prior Publication Data

US 2002/0154640 A1 Oct. 24, 2002

(51) Int. Cl.
*H04L 12/56* (2006.01)

(52) U.S. Cl. .................... 370/412; 370/468; 370/516
(58) Field of Classification Search ............... 370/412, 370/468, 516, 395.53, 401, 429, 503, 465, 370/466
See application file for complete search history.

(56) References Cited

U.S. PATENT DOCUMENTS

| | | | |
|---|---|---|---|
| 5,396,492 A | * | 3/1995 | Lien ........................ 375/371 |
| 5,412,642 A | | 5/1995 | Nunokawa |
| 5,640,388 A | | 6/1997 | Woodhead et al. |
| 5,668,841 A | * | 9/1997 | Haskell et al. ............. 375/371 |
| 5,708,656 A | | 1/1998 | Noneman et al. |
| 5,790,538 A | * | 8/1998 | Sugar ........................ 370/352 |
| 5,832,256 A | | 11/1998 | Kim |
| 5,912,880 A | * | 6/1999 | Bernstein ................... 370/252 |

* cited by examiner

*Primary Examiner*—Ricky Ngo
*Assistant Examiner*—Richard Chang
(74) *Attorney, Agent, or Firm*—Pearl Cohen Zedek Laizer, LLP

(57) ABSTRACT

Using the method of the present invention, clock mismatch or drift between a packet network transmitter and receiver can be compensated for via receiver clock rate change or bit rate change. The method includes estimating the average receiver FIFO buffer memory level over time, changing the packet network receiver bit rate or clock rate according to the average receiver FIFO buffer memory level change while still satisfying the MPEG-2 system specification.

2 Claims, 6 Drawing Sheets

METHOD OF CLOCK MISMATCH AND DRIFT COMPENSATION FOR PACKET NETWORKS

FIELD OF THE INVENTION

The present invention, generally, relates to video data communication systems through packet networks and, more particularly, to transmitting MPEG-2 transport stream data or SDI uncompressed video stream data through an IP network.

1. Background of the Invention

With the convergence among television, computer and telecommunications industries, more and more content are being sent through IP networks. Traditionally, a digital television (TV) signal is sent over a synchronous network such as DVB-ASI over cable or satellite links. The receiver can synchronize easily to the input clock that is carried with the signal.

In the applications, such as video-over-IP or video-over-ATM, the video is packetized into IP packet or ATM cells and, then, sent to the receiver through an asynchronous packet network. Due to the network jitter, it is impossible to recover the clock directly from the received packets.

In such systems, the receiver typically contains a FIFO memory buffer to facilitate a constant or nearly constant output bit rate with a variable input bit rate. However, the transmitter/receiver clock mismatch and long term drift will eventually result in the under flow or overflow of the receiver FIFO buffer memory. A variety of methods have been used to synchronize packet network transmitters and receivers.

2. Description of the Prior Art

U.S. Pat. No. 5,412,642 to Nunokawa granted May 2, 1995 describes a method that calculates a fluctuation absorbing time-base that is based on the decoding time of a heading cell.

U.S. Pat. No. 5,640,388 to Woodhead et al. granted Jun. 17, 1997 describes a method and apparatus that stores the data in a buffer and outputs the data from the buffer at a rate controlled by analyzing time-stamps within the data.

U.S. Pat. No. 5,708,656 to Noneman et al. granted Jan. 13, 1998 describes a method and apparatus that selects one of the three data transmission rates based on the state of two activity timers.

U.S. Pat. No. 5,832,256 to Kim granted Nov. 3, 1998 describes an apparatus that varies the system clock and the system time clock based on a decoded time data and a system clock value.

While these prior patents, at first appearance, have similarities with the present invention, they differ in material respects. These differences, which will be described in more detail presently, are important for the effective use of the invention to achieve its advantages. As an example, these prior art methods do not modify the receiver clock rate based on the amount of data stored in the receiver FIFO buffer memory. The present invention maintains synchronization without the need to analyze or modify the contents of the data stream.

OBJECTS AND SUMMARY OF THE INVENTION

It is an object of the present invention to provide a method for synchronizing the packet network transmitter and receiver clocks.

Briefly, the method of the present invention accomplishes the synchronization of the transmitter and receiver clocks of a packet network by computing the nominal bit rate through a process that includes monitoring the program clock reference, monitoring the average receiver FIFO buffer memory level and slowly modifying the receiver bit rate or receiver clock so that the receiver bit rate/clock can match that of transmitter.

This is accomplished while keeping the resulting ASI/SDI signal compliant with the MPEG-2 system specification (ISO/IEC 13818-n). The method of the present invention can be applied to DVB-ASI, ATSC, as well as SDI. In the last case, only the clock can be modified, as the bit rate is fixed at 270 Mbit/sec.

The above and other objects, features and advantages of the present invention will become more readily apparent as the detailed description of the presently preferred embodiment proceeds.

DETAILED DESCRIPTION OF THE INVENTION

Abbreviations and Terms.

There are abbreviations and terms used in this description that are defined as follows:

ASI=asynchronous serial interface;
ATM=asynchronous transfer mode;
ATSC=advanced television systems committee;
Bit rate=the rate at which bits are transferred;
Buffer=a group of data;
DVB=digital video broadcast;
FIFO=first in first out;
IP=internet protocol;
MPEG=motion picture expert group; and
SDI=serial digital interface.

Other terms used herein are defined in the MPEG-2 specification (ISO/IEC13818-n) and are familiar to those skilled in this art.

A method according to the present invention monitors the receiver FIFO buffer memory level and changes the bit rate or clock rate of the receiver accordingly to synchronize it with the clock rate or bit rate at the transmitter, thus preventing receiver FIFO buffer memory underflow and overflow.

Figure 1:
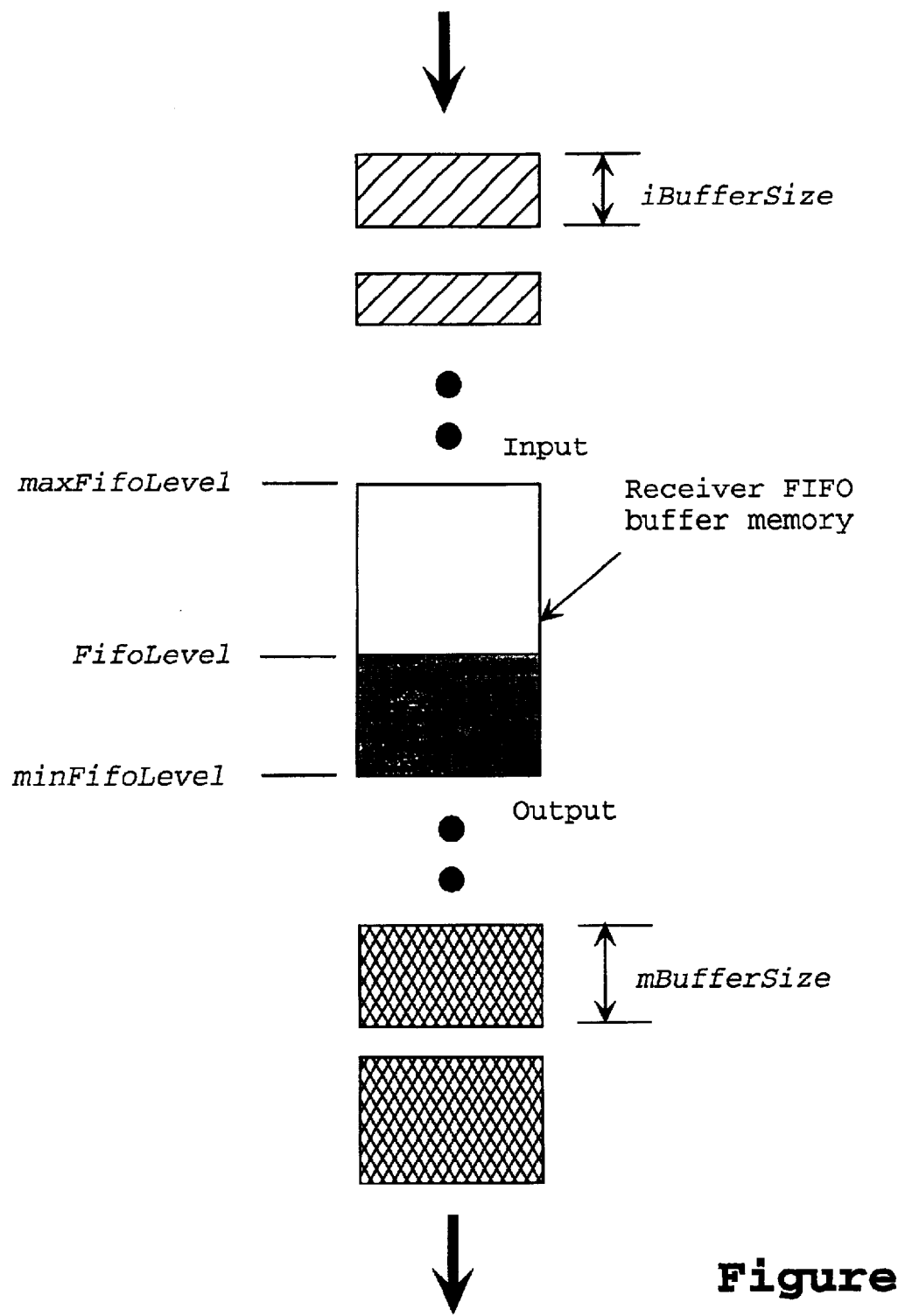
FIG. 1 illustrates the receiver FIFO buffer memory and data being input to it and output from it.

Referring now to FIG. 1 of the drawings, an illustration of a receiver FIFO buffer memory is shown having a data pipe with two terminals: input and output. At the input terminal, packet data coming from a network are injected in small buffers (iBufferSize), typically around 1500 bytes.

At the output terminal, data are pulled out in large buffers (mBufferSize), typically from 64 kilobytes (KB) to several hundred kilobytes. These buffers are called MPEG buffers.

Due to network jitter, the packet data from the network enters the receiver FIFO buffer memory at variable intervals. The MPEG data are removed from the receiver FIFO buffer memory at precise intervals. The receiver clock rate and bit rate determines the interval at which MPEG data are pulled out from the receiver FIFO buffer memory.

This interval changes slightly due to long-term clock drift of the receiver clock relative to the transmitter clock. The above two factors make the receiver FIFO buffer memory level vary over time, but the long term average of the receiver FIFO buffer memory level reflects correctly in which way the receiver clock is drifting relative to the transmitter clock.

Figure 2:
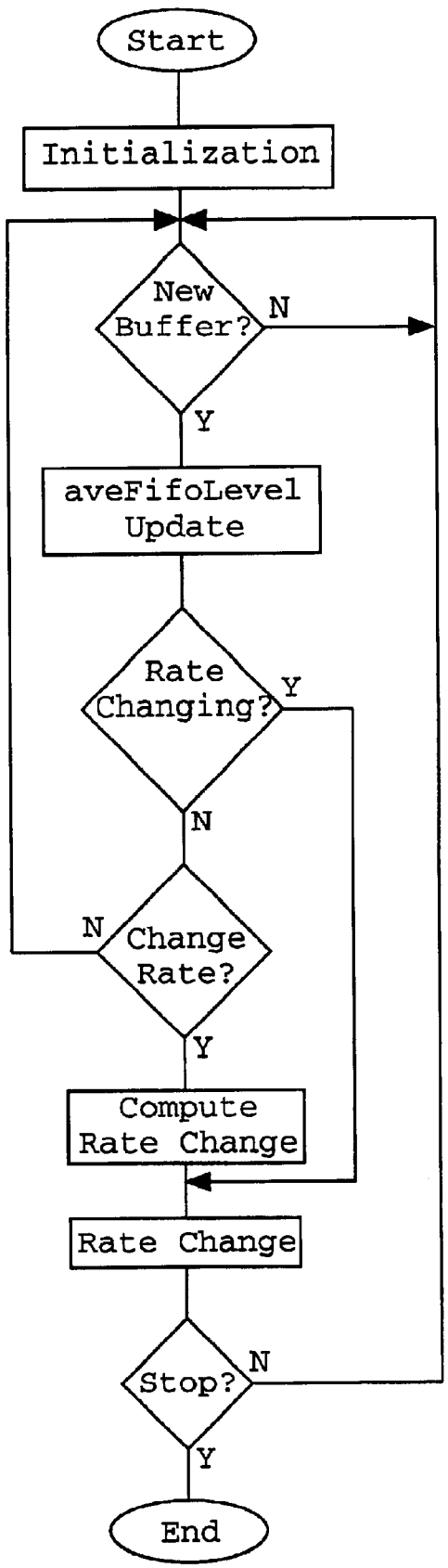
FIG. 2 is a flow chart of the clock mismatch/drift compensation algorithm.

The flow chart illustrated in FIG. 2 shows a compensation algorithm that illustrates the method of the present invention. The following paragraphs describe the compensation algorithm in detail.

Initialize the System.

The first step of the algorithm initializes certain variables used in the algorithm. The system is initialized by first transferring data from the transmitter to the receiver and storing that data in the receiver FIFO buffer memory.

The receiver FIFO buffer memory is filled exactly to the half full level before output from the receiver FIFO buffer memory is started. The half-full level of the receiver FIFO buffer memory is half way between underflow and overflow, and hence the optimum level of the receiver FIFO buffer memory. This invention attempts to maintain the buffer at approximately half full during subsequent operation.

Upon initialization, the following values are assigned:

$$m=0$$

$$aveFifoLevelPrevious=aveFifoLevelCurrent=FifoLevel$$

where m is an integer counter that counts the number of MPEG buffers removed from the receiver FIFO buffer memory;

aveFifoLevelPrevious is the average receiver FIFO buffer memory level after the previous mBufferSize bytes of data are removed from the receiver FIFO buffer memory;

aveFifoLevelCurrent is the average receiver FIFO buffer memory level after the current mBufferSize bytes of data are removed from the receiver FIFO buffer memory; and FifoLevel is the current receiver FIFO buffer memory level. Initially, the buffer was loaded to be half full, which is the predetermined TargetLevel.

Compute Average Receiver FIFO Buffer Memory Level.

A running average instead of instantaneous receiver FIFO buffer memory level is used in order to reduce the effects of network jitter on the receiver FIFO buffer memory level measurement.

Upon the removal of each MPEG buffer size (mBufferSize) of data, according to FifoLevel=FifoLevel−mBufferSize, compute recursively the average receiver FIFO buffer memory level.

If (m<Const1) m++

$$AveFifoLevelCurrent=(m*aveFifoLevelPrevious+FifoLevel)/(m+1)$$

where

Const1 is a constant integer value. In this instance, Const1 is determined empirically as 100.

Decide Whether, and how Much, to Change Bit Rate.

MPEG-2 system specification (ISO/IEC13818-n) mandates that the value of the system clock frequency measured in Hz meet the following constraints:

$$27000000-810 \leq system\_clock\_frequency \leq 27000000+810$$

where system_clock_frequency is the clock frequency of the system; and ≦ is "less than or equal to".

The MPEG-2 system specification dictates that the rate of change of system clock frequency meets the following constraint:

Rate of change of system_clock_
frequency≦clockAdjustmentRate where clockAdjustmentRate is the maximum clock adjustment rate that complies with MPEG-2 system specification (ISO/IEC13818-n); and ≦ is "less than or equal to".

clockAdjustmentRate=0.075 Hz/sec

In order to meet the clock range constraint, the maximum change of the system_clock_frequency should be bounded.

$$deltaRateMax=clockBound*mRate/clockRate.$$

$$deltaRateMax=810*mRate/27000000.$$

where deltaRateMax is the maximum rate of change of the system_clock_frequency;

clockRate is the nominal clock rate of the MPEG-2 transport stream, clockRate=27,000,000 Hz;

clockBound is the maximum allowed clock drift according to MPEG-2 system specification (ISO/IEC13818-n), clockBound=810; and mRate is the bit rate of the MPEG-2 transport stream at the transmitter.

The crystal of the system clock on each transmitter and receiver has to meet the following constraints in order for the receiver to be able to lock to the transmitter clock:

$$27,000,000-405 \leq system\_clock\_frequency \leq 27,000,000+405.$$

To decide whether bit rate change is needed, current and previous average receiver FIFO buffer memory levels are monitored. The bit rate change on the receiver has the goal to match the receiver FIFO buffer memory level target of half full. There are three cases as illustrated in FIGS. 3, 4, and 5 of the drawings.

Figure 3:
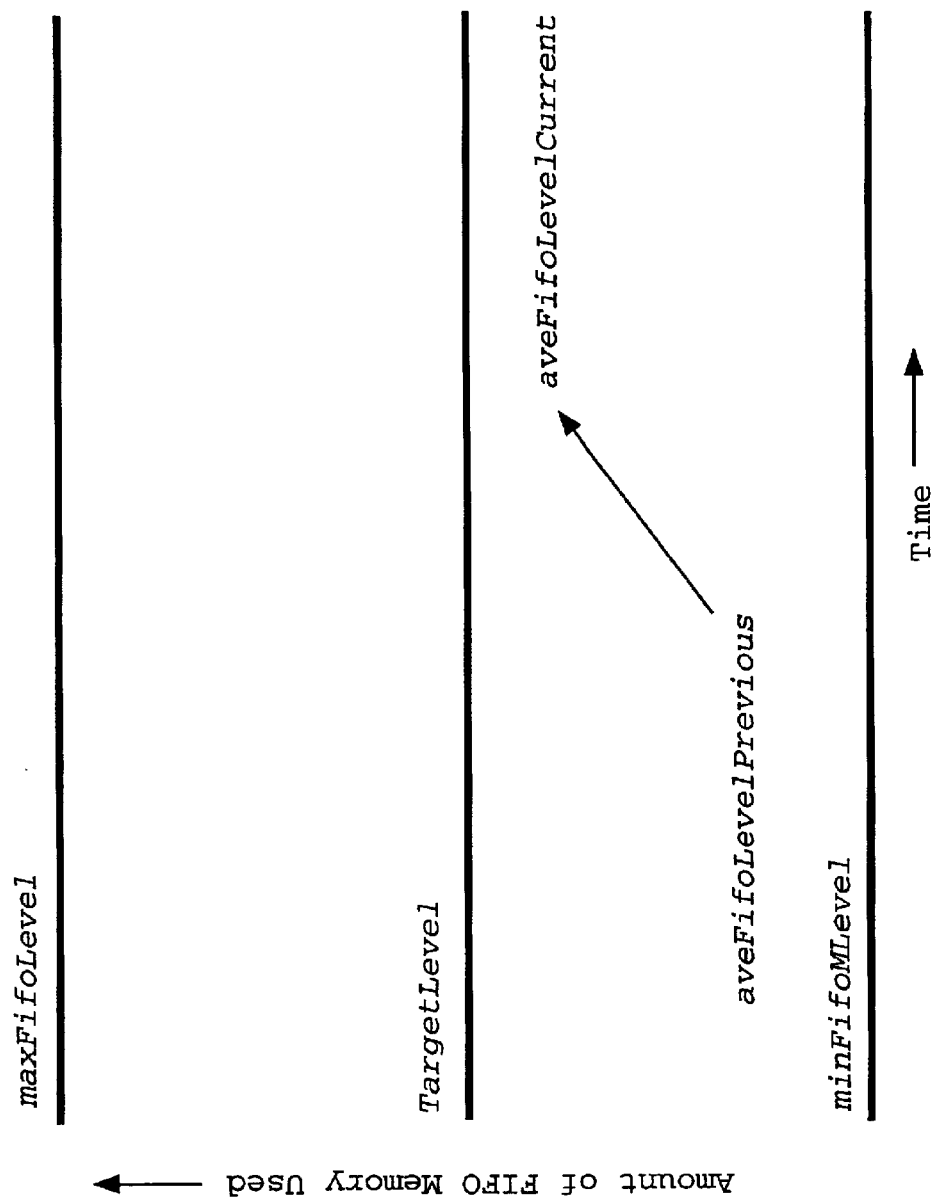
FIG. 3 illustrates a receiver FIFO buffer memory level change vs. time from a low level to a low level nearer the target level.

FIG. 3 shows the case where the current average receiver FIFO buffer memory level is closer to the target level than the previous average receiver FIFO buffer memory level. The change shows a good trend so the bit rate change is set to the minimum and the current bit rate is not changed.

If |(aveFifoLevelCurrent−TargetLevel)|<|(aveFifoLevelPrevious−TargetLevel)|then the BitRateChange=MinBitRateChange.

Figure 4:
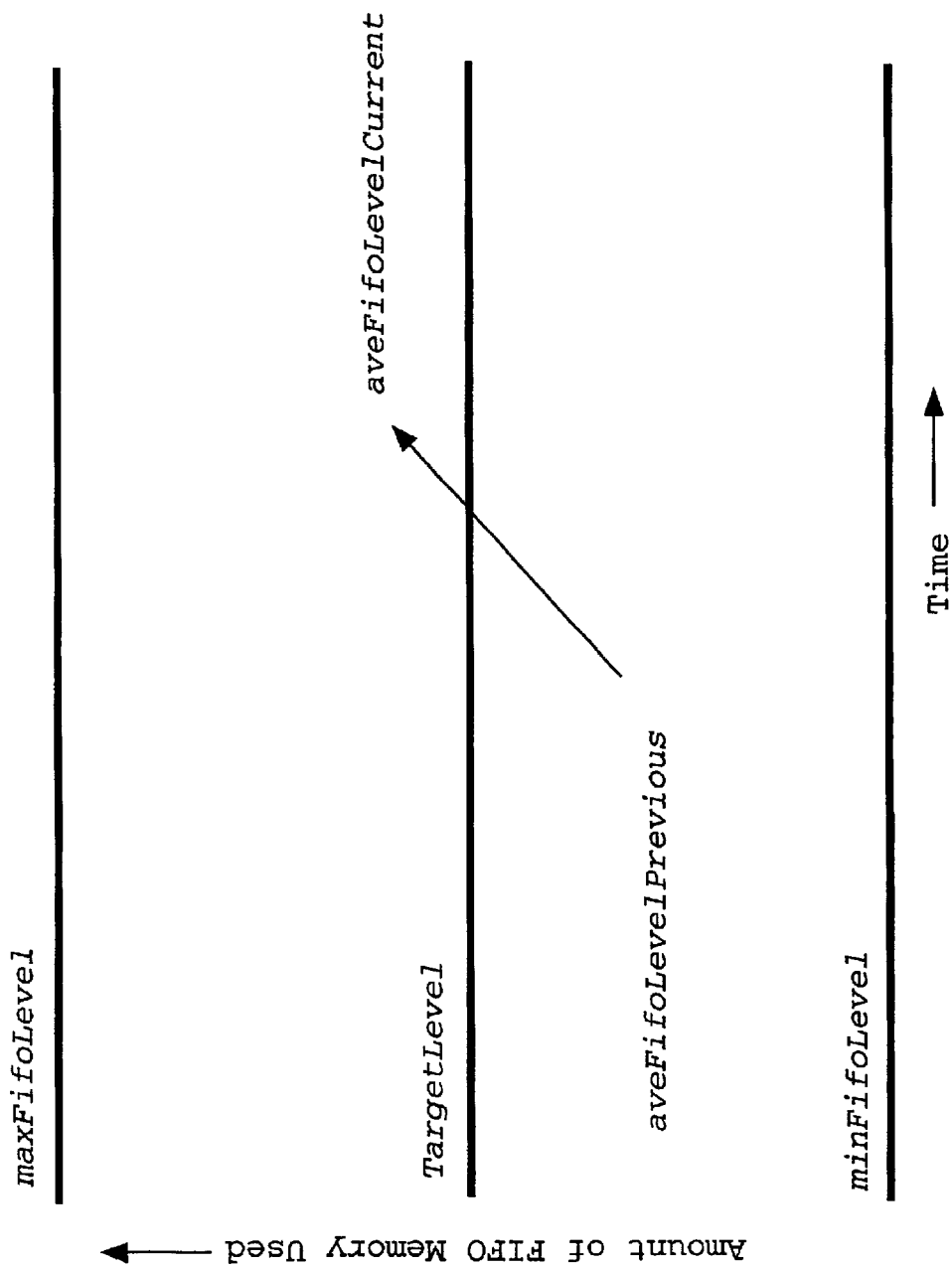
FIG. 4 illustrates a receiver FIFO buffer memory level change vs. time from a level below the target level to a level above the target level.
Figure 5:
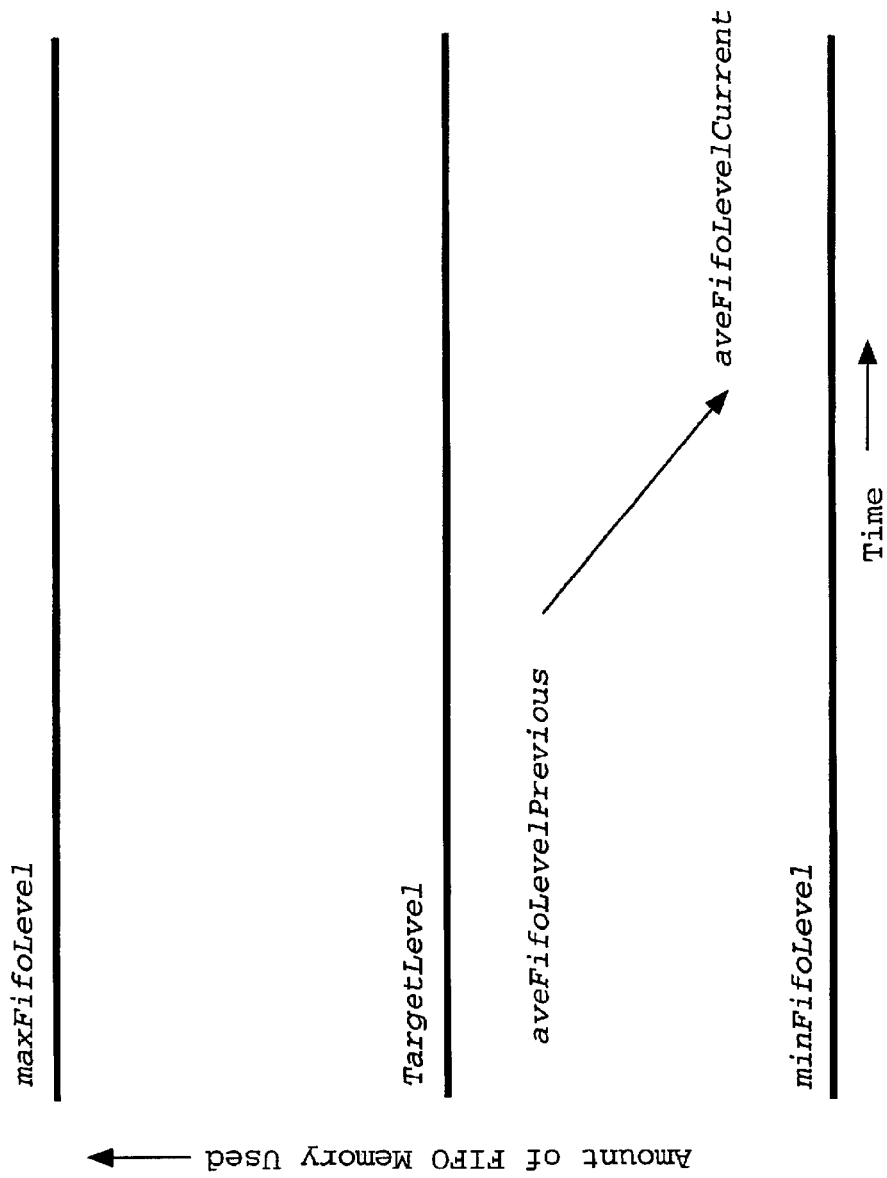
FIG. 5 illustrates a receiver FIFO buffer memory level change vs. time from a low level to a lower level.

FIG. 4 shows the case where the previous average receiver FIFO buffer memory level and current average receiver FIFO buffer memory level occur on different sides of the Target level. In this case, the bit rate change direction is reversed, and the bit rate change is set to the minimum.

If
aveFifoLevelCurrent>TargetLevel>aveFifoLevelPrevious or if aveFifoLevelCurrent<TargetLevel<aveFifoLevelPrevious then BitRateChangeDir=−BitRateChangeDir, and BitRateChange=MinBitRateChange FIG. 5 shows the current average receiver FIFO buffer memory level is further away from the Target level than previous average receiver FIFO buffer memory level. In this case, the bit rate change is doubled and the direction is unchanged.

If |(aveFifoLevelCurrent−TargetLevel)|>|(aveFifoLevelPrevious−TargetLevel)|then BitRateChange= 2*BitRateChange.

Change Bit Rate Slowly According to MPEG-2 Specification.

In order to meet the MPEG-2 clock rate change constraint, the receiver bit rate can be changed 1 bit/sec up or down every N MPEG buffers.

Once the amount of bit rate change is decided, the receiver will change its bit rate by 1 bit/sec every N MPEG buffers until the needed change is done. IsBitRateChange is a flag indicating a bit rate change is needed.

When a change is needed, this flag is set to TRUE. Thereafter, the change is made every N MPEG buffers until the change is complete, then IsBitRateChange is set to false.

Between the moment bit rate change started until the moment the required bit rate change is applied, no new bit rate change is computed, but average FIFO level is still calculated and logged.

By using the algorithm described, the packet network transmitter and receiver clocks are synchronized while keeping the resulting ASI/SDI signal compliant with the MPEG-2 system specification (ISO/IEC13818-n).

In particular, the above algorithm can be applied easily to system clock rate change instead of bit rate change.

The above algorithm can be implemented in host software, embedded software or in hardware, as long as the hardware supports instantaneous and continuous bit rate change or clock rate change.

The buffer check interval can be increased significantly once the receiver clock is locked to the transmitter clock. The initial change can be considered as compensating for clock mismatch, and long-term change can be considered as compensating for clock drift.

A sample software program for clock mismatch/drift compensation is provided in Appendix A.

Various performance parameters relative to the method of the present invention and the minimum size of the receiver FIFO buffer memory required can be calculated as shown in Appendix B.

Appendix A

Sample Program for Clock Mismatch/Drift Compensation

```
/***** start clock drift compensation ************/
int Err, FifoLevel;
Bool IsFirstTime, IsRateChanging;
int n, N;
Err = GetFifoLevel(&FifoLevel);
if(IsFirstTime) {
    aveFifoLevelPrevious = FifoLevel;
    aveFifoLevel = FifoLevel;
    CurrentBit rate = mRate;
    IsFirstTime = 0;
}
aveFifoLevel = (aveFifoLevel*m + FifoLevel)/(m+1);
if(m<100)
    m++;
n++;
if(n%N = = 0 && (!IsRateChanging)) {//test only when we finished current bit rate change
    aveFifoLevelCurrent = aveFifoLevel;
if(((Target>aveFifoLevelPrevious)&&(Target>aveFifoLevelCurrent))||((Target<aveFifoLevelPrevious)&&(Target<aveFifoLevelCurrent))) {
    //previous and current fifo levels are on the same side of the Target
        if(abs(Target−aveFifoLevelPrevious)<abs(Target−aveFifoLevelCurrent)) {
            //we are still lagging behind, increase delta to catch up
```

```
            delta = delta * 2;
            IsRateChange = 1;
            if(delta > DeltaRateMax)
                delta = DeltaRateMax;
        }
        else {
            //we are in the correct trend, remember the delta and do not change the bit rate
            IsRateChange = 0;
            //reduce delta to minimum
            delta = 1;
        }
    }
    else {
        IsRateChange = 1;
        //set delta to minimum
        delta = 1;
    }
if(IsRateChange) {
    if(Target > aveFifoLevelCurrent) {
        //slow down clock
        delta1 = −delta;
        if(CurrentBit rate + delta1 − mRate < −DeltaRateMax) {
            delta1 = mRate −CurrentBit rate − DeltaRateMax;
        }
    }
    else if(Target < aveFifoLevelCurrent) {
        //speed up clock
        delta1 = delta;
        if(CurrentBit rate + delta1 − mRate > DeltaRateMax)
        {
            delta1 = mRate −CurrentBit rate + DeltaRateMax;
        }
    IsRateChanging = 1;
    if(delta1 = = 0) {
        delta = 1;
    }
    else {
        delta = abs(delta1);
    }
}//end if(IsRateChange)
aveFifoLevelPrevious = aveFifoLevelCurrent;
}//end if(n%N= =0)
//change the bit rate gradually now
if((n%N= =0) && IsRateChanging) {
    if(delta1 >0) {
        //increase bit rate by 1bit/sec
        CurrentBit rate = mpTransportSetBit rate(m_transport, 1, BIT RATE_RELATIVE);
        delta1− −;
    }
    else if (delta1 <0) {
        //decrease bit rate by 1bit/sec
        CurrentBit rate = mpTransportSetBit rate(m_transport, −1, BIT RATE_RELATIVE);
        delta1++;
    }
    else {//delta1 = 0
        //finished rate change
        IsRateChanging = 0;
    }
}
/*****end clock drift compensation**********/
```

Appendix B

Various performance parameters relative to the method of the present invention and the minimum size of the receiver FIFO buffer memory required can be calculated as follows: Theoretical Bounds Without Network Jitter.

In absence of network jitter, the time needed to lock receiver to transmitter clock, and the minimum amount of receiver FIFO buffer memory required can be computed.

The bit rate at the receiver will appear as the following bit rate on the transmitter:

$$mRate'=RxClockRate*mRate/TxClockRate$$

where

TxClockRate is the transmitter clock speed;

RxClockRate and receiver clock speed; and mRate' is the bit rate at the receiver.

If 1 bit/sec is changed every N MPEG buffers, it will need $|mRate'-mRate|*N$ buffers to lock the receiver bit rate to transmitter bit rate. N is the number of MPEG buffer removals between adjustment of bit rate. N is computed as follows:

$$N=nBuffersPerSec/AdjustableBit\ ratePerSec=(mRate/mBufferSize*8)*(27000000/(mRate*0.075))=45000000/mBufferSize$$

where nBuffersPerSec is the number of MPEG buffer removals per second.

$$nBuffersPerSec=mRate/(mBufferSize*8)$$

adjustableBit ratePerSec is the bit rate adjustment in units of bits/sec.

$$adjustableBit\ ratePerSec=mRate*ClockAdjustmentRate/clockRate=mRate*0.075/27000000.$$

It is important to note that the interval does not depend on bit rate. The decision whether bit rate change is needed can be made every N MPEG buffer removal from the receiver FIFO buffer memory.

The time needed to match the bit rate is:

$$\Delta T=|mRate'-mRate|*N/(mRate/(mBufferSize*8))$$

where

ΔT is the time, in seconds, needed to match the bit rate.

mBufferSize is the size of the receiver FIFO buffer memory output buffer.

Between the time the system started to the time the receiver is locked to the transmitter, the average bit rate difference is $|mRate'-mRate|/2$. The total buffer drain or fill in this time interval is:

$$\Delta Buffer=(|mRate'-mRate|/2)*\Delta T/8\ (bytes).$$

where

ΔBuffer is the number of bytes of data transferred to or from the receiver FIFO buffer memory in the ΔT time interval.

The minimum size of FIFO to prevent overflow and underflow due to clock mismatch will be:

$$minFifoSize=2*\Delta Buffer.$$

where minFifoSize is the minimum size of FIFO to prevent overflow and underflow due to clock mismatch.

Bounds with Network Jitter.

Figure 6:
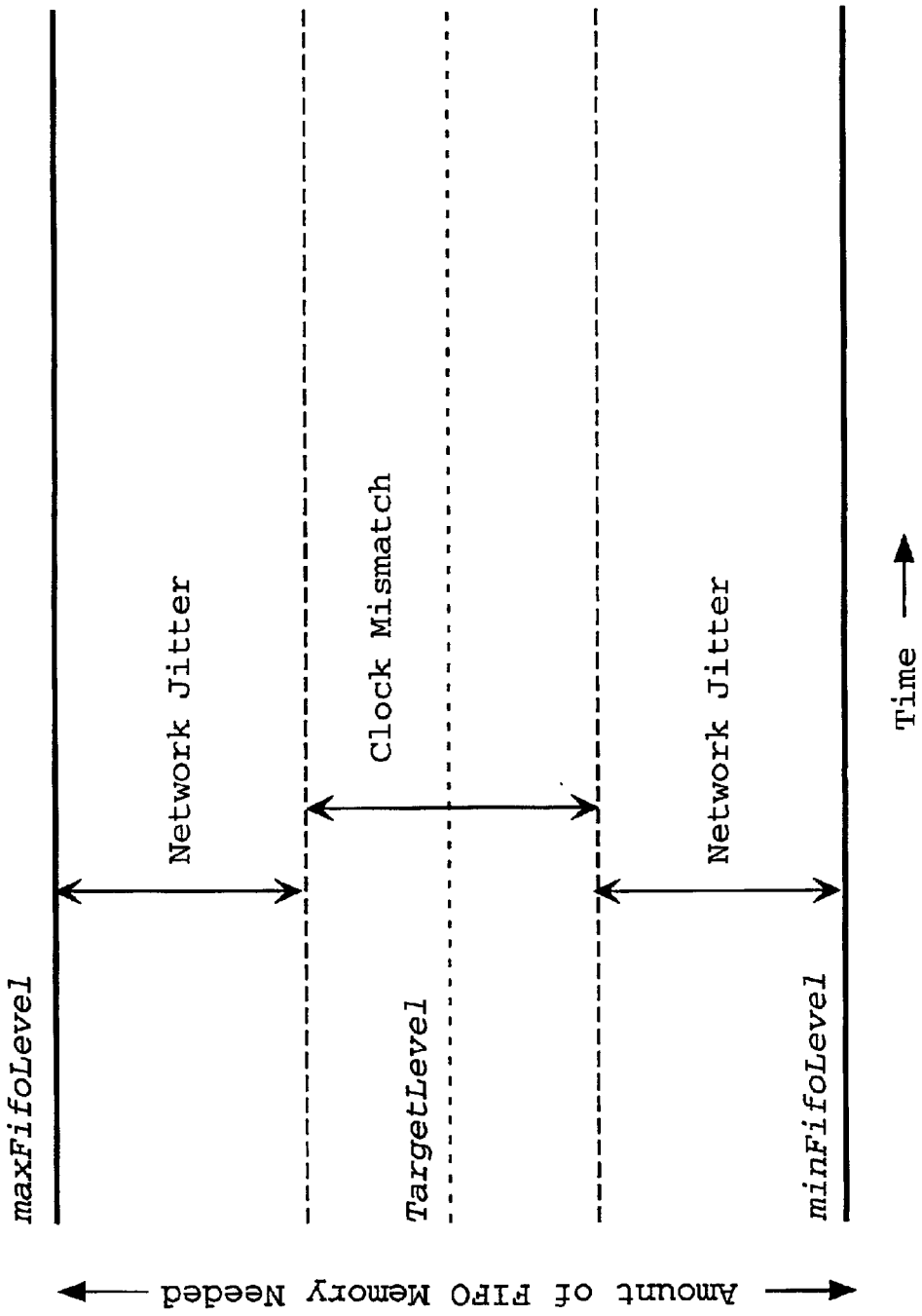
FIG. 6 illustrates the receiver FIFO buffer memory size vs. time necessary to accommodate network jitter and clock mismatch.

In a real network environment, an even larger receiver FIFO buffer memory is needed to accommodate network jitter (FIG. 6).

$$J=(FifoSize-miniFifoSize)*8/mRate.$$

where

J is the maximum network jitter.

Rearranging the above equation, the required receiver FIFO buffer memory size is computed as follows:

$$FifoSize=J*mRate/8+minFifoSize.$$

The invention has been shown, described and illustrated in substantial detail with reference to presently preferred forms of the invention. It will be understood by those skilled in this art that various changes and modifications may be made without departing from the spirit and scope of the invention which is defined by the appended claims.

What is claimed is:

1. A method for correcting the clock in a digital video data stream transmitted in packets over a network, said method comprising the steps of:
   a) placing said video packets in a FIFO memory;
   b) outputting data from said FIFO memory according to a clock rate or bit rate that is adjustable;
   c) filtering the level of data in said FIFO memory to produce a current average level and a previous average level; and
   d) changing said adjustable clock rate or bit rate according to said current average level and said previous average level in accordance with one of the relationships:
      i) when an absolute value of said current average level minus a target level is less than the absolute value of said previous average level minus said target level, then set a bit rate change value equal to a predetermined minimum bit rate change value;
      ii) when said current average level is greater than said target level which is, in turn, greater than a previous FIFO level, then reverse a bit rate change direction and set said bit rate change value equal to said predetermined minimum bit rate change value;
      iii) when said current average level is less than said target level which is, in turn, less than said previous average level, then reverse said bit rate change direction and set said bit rate change value equal to said predetermined minimum bit rate change value; and
      iv) when an absolute value of said average current level minus said target level is greater than an absolute value of said previous average level minus said target level, then double said bit rate change value;
   whereby said FIFO memory level is drive towards a said target level.

2. The method of claim 1, wherein in Step (d), the rate at which said clock is changed is limited to a maximum rate in accordance with at least one predetermined specification.

* * * * *